United States Patent
Sato et al.

(10) Patent No.: US 10,542,187 B2
(45) Date of Patent: Jan. 21, 2020

(54) IMAGE PROCESSING APPARATUS AND IMAGE PROCESSING METHOD

(71) Applicant: CANON KABUSHIKI KAISHA, Tokyo (JP)

(72) Inventors: Masahiro Sato, Tokyo (JP); Hirofumi Urabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/903,310

(22) Filed: Feb. 23, 2018

(65) Prior Publication Data

US 2018/0255207 A1 Sep. 6, 2018

(30) Foreign Application Priority Data

Mar. 1, 2017 (JP) .................................. 2017-038271
Nov. 28, 2017 (JP) .................................. 2017-228015

(51) Int. Cl.
*H04N 1/60* (2006.01)
*G09G 5/02* (2006.01)
(Continued)

(52) U.S. Cl.
CPC ......... *H04N 1/6027* (2013.01); *H04N 5/2355* (2013.01); *H04N 5/355* (2013.01); *H04N 9/73* (2013.01)

(58) Field of Classification Search
CPC ............................ H04N 1/6027; H04N 19/186
See application file for complete search history.

(56) References Cited

U.S. PATENT DOCUMENTS 6,774,909 B1 * 8/2004 Nishio .................. G09G 5/028
345/593
2004/0130555 A1 * 7/2004 Ko ......................... G09G 5/02
345/589
(Continued)

FOREIGN PATENT DOCUMENTS

JP 2004-147229 A 5/2004
JP 2005-191985 A 7/2005
(Continued)

OTHER PUBLICATIONS

The above foreign patent documents were cited in the Sep. 4, 2018 Japanese Office Action, which is enclosed without an English Translation, that issued in Japanese Patent Application No. 2017-228015.

(Continued)

*Primary Examiner* — Jitesh Patel
(74) *Attorney, Agent, or Firm* — Cowan, Liebowitz & Latman, P.C.

(57) ABSTRACT

An image processing apparatus includes: a converting unit configured to convert a color of input image data based on information representing a correspondence between a brightness level and a color, and generate converted image data; and a setting unit configured to set a gradation characteristic of the input image data, wherein the converting unit converts the color of the input image data based on information representing a first correspondence in a case where the gradation characteristic set by the setting unit is a first gradation characteristic, and converts the color of the input image data based on information representing a second correspondence in a case where the gradation characteristic set by the setting unit is a second gradation characteristic.

13 Claims, 7 Drawing Sheets

(51) Int. Cl.
*H04N 9/64* (2006.01)
*H04N 19/186* (2014.01)
*H04N 5/355* (2011.01)
*H04N 9/73* (2006.01)
*H04N 9/74* (2006.01)
*H04N 5/235* (2006.01)

(56) References Cited

U.S. PATENT DOCUMENTS

| | | | |
|---|---|---|---|
| 2009/0096809 A1* | 4/2009 | Bezryadin | G06T 11/001 345/597 |
| 2012/0299967 A1* | 11/2012 | Urabe | G09G 5/14 345/660 |
| 2013/0129250 A1* | 5/2013 | Kokemohr | G06T 5/009 382/274 |
| 2013/0258203 A1 | 10/2013 | Atkins et al. | |
| 2014/0022460 A1* | 1/2014 | Li | G06T 5/009 348/708 |
| 2014/0037206 A1* | 2/2014 | Newton | H04N 19/597 382/166 |
| 2015/0213586 A1* | 7/2015 | Koike | G06T 5/007 382/284 |
| 2018/0007372 A1 | 1/2018 | Lasserre et al. | |
| 2018/0352206 A1* | 12/2018 | Uchimura | G11B 27/10 |

FOREIGN PATENT DOCUMENTS

| | | |
|---|---|---|
| JP | 2006-115249 A | 4/2006 |
| JP | 2014-519620 A | 8/2014 |
| JP | 2014-167609 A | 9/2014 |
| WO | 2012/153224 A1 | 11/2012 |
| WO | 2016/055178 A1 | 4/2016 |

OTHER PUBLICATIONS

The above patent documents were cited in a European Search Report dated Jul. 20, 2018 , which is enclosed, that issued in the corresponding European Patent Application No. 18159108.2.

* cited by examiner

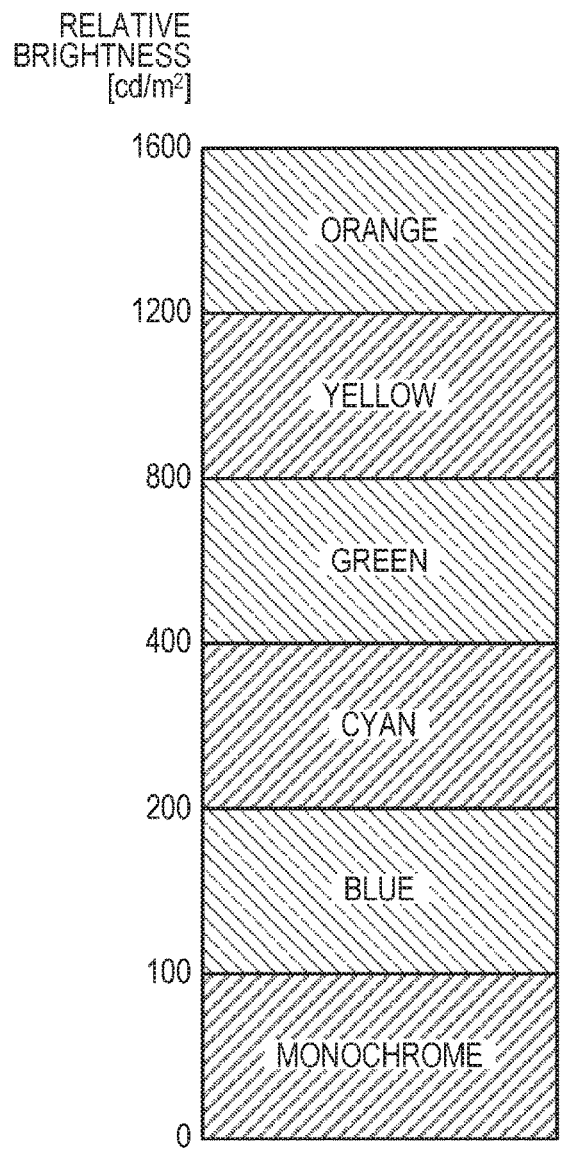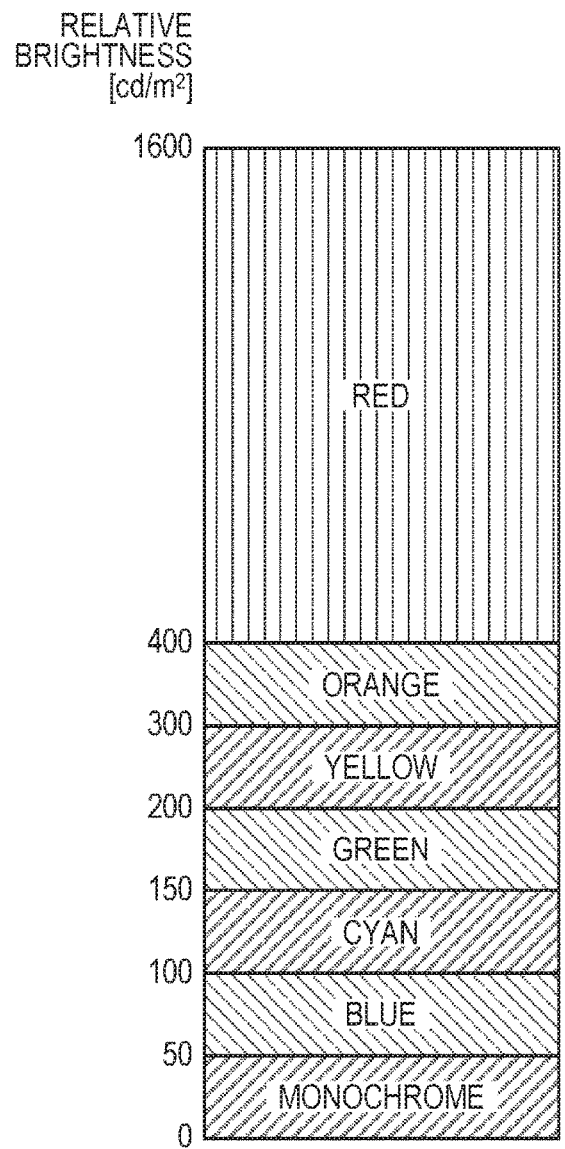

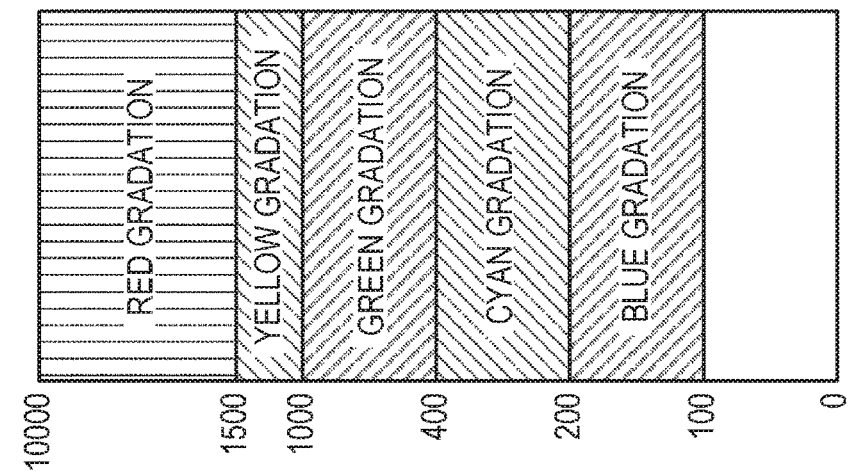
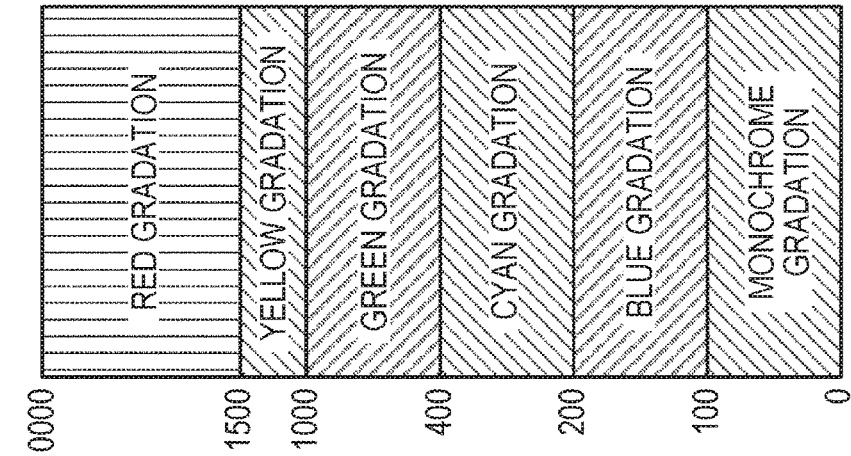
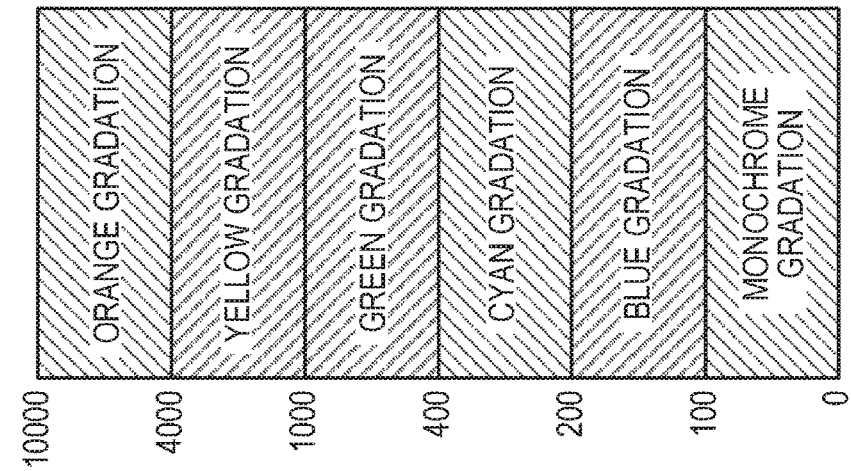

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

In the image production field, opportunities to handle image data having a wide dynamic range are increasing. The dynamic range is a range of values related to brightness. A wide dynamic range is called "high dynamic range (HDR)", and a dynamic range that is narrower compared to HDR is called "standard dynamic range (SDR)". Image data having HDR is called "HDR image data", and image data having SDR is called "SDR image data".

Currently the standardization of HDR image data, which can be transmitted using Serial Digital Interface (SDI) cable, for example, is advancing. For example, ST 2084, standardized by Society of Motion Picture and Television Engineers (SMPTE), is proposed. A technique to display an image based on HDR image data (HDR image) at high brightness is also proposed.

ST 2084 indicates gradation characteristics based on the visual characteristics of the human eye, and defines the brightness of HDR image data by the absolute brightness. The ST 2084 defines the absolute brightness up to 10,000 $cd/m^2$. However, a general display apparatus can display only a several hundred to several thousand $cd/m^2$ brightness, and cannot display a 10,000 $cd/m^2$ brightness.

Therefore display apparatuses which can set a part of the dynamic range of an HDR image data to a range in which the display apparatus can appropriately display (e.g. absolute brightness range up to 1000 $cd/m^2$, absolute brightness range up to 2000 $cd/m^2$) were proposed. Hereafter, this setting function is called the "HDR setting function", and the range which is set by the HDR setting function is called the "setting HDR". In the display apparatus having the HDR setting function, an image based on the setting HDR is displayed with gradation conforming to the standard (gradation characteristic) of the HDR image data. For example, if the standard of the HDR image data is ST 2084, an image based on the setting HDR is displayed with the absolute brightness defined in ST 2084. A brightness related value that is greater than the maximum value of a plurality of brightness related values belonging to the setting HDR is displayed as a blank dot.

As a system of the HDR image data (standard; gradation characteristic), not only the system of defining the brightness of the HDR image data by the absolute brightness, but also a system of defining the brightness of the HDR image data by the relative brightness was proposed.

In such a field of image production, there is need to confirm the brightness distribution of the input image data. An available assist function to confirm the brightness distribution of the input image data is a function to convert the color of the input image data into a color in accordance with the brightness gradation value of the input image data. The conversion of a color can be regarded as "coloration", and such an assist function can be regarded as a "color conversion function" or a "coloration function". By displaying an image based on the image data after colors are converted by the color conversion function, the user can confirm the brightness gradation values of the input image data by colors.

FIG. 8 is an example of the correspondence between the brightness gradation value of the input image data and the color after the conversion by the color conversion function. FIG. 8 is a case when the brightness gradation value of the input image data is a 10-bit value (0 to 1023). In the case of FIG. 8, the 6 colors correspond to 6 ranges constituting the dynamic range (range of brightness gradation values) of the input image data respectively.

A technique related to the color conversion function is disclosed in Japanese Patent Application Publication No. 2014-167609, for example. In the technique disclosed in Japanese Patent Application Publication No. 2014-167609, a zebra pattern is displayed in an image region in which the brightness level (brightness gradation value) is at least a predetermined value.

SUMMARY OF THE INVENTION

As mentioned above, in the case of the conventional color conversion function, a color of the input image data is converted into a color in accordance with the brightness gradation value of the input image data. Therefore even if the conventional color conversion function is used, the user cannot recognize the absolute brightness defined by the gradation characteristic of the input image data, the relative brightness defined by the gradation characteristic of the input image data and the like. Further, the user cannot recognize the distribution of a plurality of absolute brightness values which are delimited by 100 $cd/m^2$, 200 $cd/m^2$ and the like.

In some cases, a brightness related value close to the maximum value of a plurality of brightness related values belonging to HDR may not be used for display, but in the conventional color conversion function, even the brightness related value that is not used for display is included in the targets of the color conversion processing (processing using the color conversion function). As a result, it becomes difficult to confirm the distribution of the brightness related values. A possible method of solving this problem is narrowing the HDR to the setting HDR, and then converting each color of the image data into a color in accordance with the brightness gradation value of the image data having the setting HDR. If this method is used, however, the distribution of the brightness related values, which belong to the HDR but not to the setting HDR, cannot be confirmed.

The present invention in its first aspect provides an image processing apparatus, comprising:

a converting unit configured to convert a color of input image data based on information representing a correspondence between a brightness level and a color, and generate converted image data; and a setting unit configured to set a gradation characteristic of the input image data, wherein the converting unit converts the color of the input image data based on information representing a first correspondence in a case where the gradation characteristic set by the setting unit is a first gradation characteristic, and converts the color of the input image data based on information representing a second correspondence in a case where the gradation characteristic set by the setting unit is a second gradation characteristic.

The present invention in its second aspect provides an image processing method, comprising:

a converting step of converting a color of input image data based on information representing a correspondence between a brightness level and a color, and generating converted image data; and a setting step of setting a gradation characteristic of the input image data, wherein in the converting step the color of the input image data is converted based on information representing a first correspondence in a case where the gradation characteristic set in the setting step is a first gradation characteristic, and the color of the input image data is converted based on information representing a second correspondence in a case where the gradation characteristic set in the setting step is a second gradation characteristic.

The present invention in its third aspect provides a non-transitory computer readable medium that stores a program, wherein the program causes a computer to execute:

a converting step of converting a color of input image data based on information representing a correspondence between a brightness level and a color, and generating converted image data; and a setting step of setting a gradation characteristic of the input image data, wherein in the converting step the color of the input image data is converted based on information representing a first correspondence in a case where the gradation characteristic set in the setting step is a first gradation characteristic, and the color of the input image data is converted based on information representing a second correspondence in a case where the gradation characteristic set in the setting step is a second gradation characteristic.

Further features of the present invention will become apparent from the following description of exemplary embodiments with reference to the attached drawings.

BRIEF DESCRIPTION OF THE DRAWINGS

FIG. 6A and FIG. 6B are examples of a correspondence (correspondence of the relative brightness and the color) according to this embodiment;

FIG. 7A to FIG. 7C are examples of a correspondence (correspondence of the absolute brightness and the color) according to this embodiment.

DESCRIPTION OF THE EMBODIMENTS

An embodiment of the present invention will be described.

In the following, an example of a display apparatus having an image processing apparatus according to this embodiment will be described. The display apparatus is, for example, a liquid crystal display apparatus, an organic electro luminescence (EL) display apparatus, a plasma display apparatus, a micro electro mechanical system (MEMS) shutter type display apparatus or the like.

The image processing apparatus may be an apparatus that is separated from the display apparatus. The image processing apparatus that is separated from a display apparatus is, for example, a personal computer (PC), a playback system (e.g. Blu-ray player), a server apparatus or the like.

Figure 1:
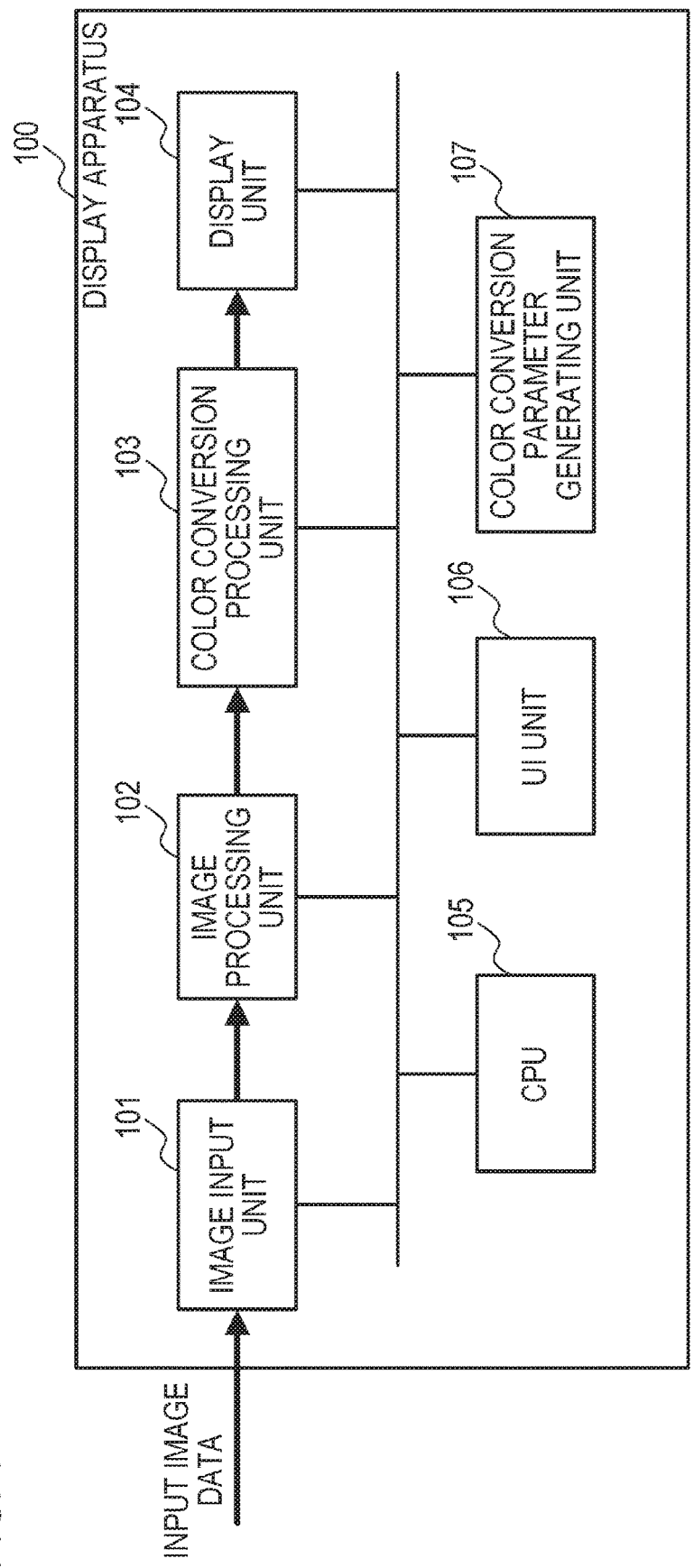
FIG. 1 is a diagram depicting an example of a configuration of a display apparatus according to this embodiment.

FIG. 1 is a diagram depicting a configuration example of a display apparatus 100 according to this embodiment. The display apparatus 100 includes an image input unit 101, an image processing unit 102, a color conversion processing unit 103, a display unit 104, a CPU 105, a user interface (UI) unit 106, and a color conversion parameter generating unit 107.

The image input unit 101 acquires image data (input image data), and outputs the input image data to the image processing unit 102. In this embodiment, the image input unit 101 acquires the input image data from outside the display apparatus 100 (image processing apparatus). In concrete terms, the image input unit 101 includes an SDI input terminal conforming to SDI standards, and acquires the SDI signal from outside the display apparatus 100 via the SDI input terminal. Then the image input unit 101 converts the SDI signal into image data having a data format that can be processed onboard the display apparatus 100, and outputs the converted image data to the image processing unit 102. In this embodiment, a gradation value of the input image data is a 10-bit value (0 to 1023).

The method of acquiring the input image data is not especially limited. For example, the display apparatus 100 (image processing unit) may include a storage unit which stores the image data, so that the image input unit 101 reads the image data (input image data) from the storage unit. The image signal inputted to the image input unit 101 need not be an SDI signal. And the number of bits (bit depth) of the input image data may be more or less than 10 bits.

The image processing unit 102 determines the gradation characteristic of the input image data (characteristic determination processing), in accordance with the user operation (instruction from the user) to the display apparatus 100 (image processing apparatus). Here the user operation is a user operation to specify the gradation characteristic, for example. The image processing unit 102 performs the image processing, based at least on the determined gradation characteristic, on the input image data outputted from the image input unit 101. Thereby the processing image data is generated. Then the image processing unit 102 outputs this processing image data to the color conversion processing unit 103. The gradation characteristic is a characteristic related to the correspondence between the pre-converted gradation value and the converted gradation value in the gradation conversion processing, to convert the gradation value of the image data, for example. In this embodiment, one of the three types of gradation characteristics: gamma 2.2, SMPTE ST 2084 (perceptual quantization (PQ)); and Log, is determined as the gradation characteristic of the input image data. The corresponding gradation characteristic is not limited to the above mentioned gradation characteristic. For example, Hybrid Log-Gamma (HLG) specified in ARIB STD-B67, may be used. In the following description, "the gradation characteristic is ST 2084" means that the gradation characteristic is the PQ defined in SMPTE ST 2084.

A wide dynamic range is called the "high dynamic range (HDR)", and a dynamic range, which is narrower than the HDR, is called the "standard dynamic range (SDR)". The dynamic range is a range of values related to the brightness (brightness level). The brightness related value (brightness level) is, for example, a brightness gradation value (Y value), and absolute brightness, a relative brightness or the like. Image data having HDR is called "HDR image data", and image data having SDR is called "SDR image data". Gamma 2.2 is the gradation characteristic corresponding to SDR, and ST 2084 and Log are the gradation characteristics corresponding to HDR.

ST 2084 is a gradation characteristic when the absolute brightness corresponds to the pixel value (gradation value) of the input image data, and Log is a gradation characteristic when the relative brightness (relative brightness level) corresponds to the pixel value of the input image data. In other words, ST 2084 is a gradation characteristic when the brightness of the input image data is defined by the absolute brightness, and Log is a gradation characteristic when the brightness of the input image data is defined by the relative brightness. HLG is a gradation characteristic when the brightness of the input image data is defined by the relative brightness. The correspondence of the relative brightness to the pixel value can be regarded as the indirect correspondence of the brightness level to the pixel value. If HLG is used as the gradation characteristic, processing the same as the case when the gradation characteristic is Log is performed.

In the case when the brightness (absolute brightness or relative brightness) corresponds to the pixel value, as in the case of ST 2084 and Log, a characteristic related to the correspondence between the pixel value of the image data and the brightness of the image data can be used as the gradation characteristic. In concrete terms, as the information on the gradation characteristic, the information that represents the correspondence between the pixel value of the image data and the brightness of the image data (e.g. function, table) can be used. This information is called "electro-optical transfer function (EOTF)".

The image processing performed by the image processing unit 102 includes the gradation conversion processing and the range conversion processing. The gradation conversion processing is a processing to convert the gradation value of the input image data in accordance with the determined gradation characteristic. For example, in the gradation conversion processing, the gradation value of the input image data is converted using a predetermined look up table (LUT), which corresponds to the determined gradation characteristic. In the gradation conversion processing, a one-dimensional LUT (1-DLUT) or the like is used as the predetermined LUT. Instead of the predetermined LUT, a predetermined function may be used.

The range conversion processing is a processing to correct the input image data (gradation value of the input image data), so that at least a part of the dynamic range of the input image data can be appropriately displayed. In this embodiment, the range conversion processing is performed in the case when the gradation characteristic of the input image data is ST 2084, and when the gradation characteristic of the input image data is Log.

In this embodiment, the image processing unit 102 determines at least a part of the dynamic range of the input image data as the specified display range, in accordance with the user operation to the display apparatus 100 (image processing apparatus). In concrete terms, the image processing unit 102 determines the maximum value of a plurality of brightness related values belonging to the specified display range according to the user operation (first threshold determination processing). Thereby the range, from the minimum value of a plurality of brightness related values belonging to the dynamic range of the input image data, to the determined maximum value (maximum value of a plurality of brightness related values belonging to the specified display range), is used as the specified display range. Then in the range conversion processing, the input image data is corrected based on the specified display range (determined maximum value). Thereby when the later mentioned color conversion processing is not performed, the specified display range is displayed at a gradation conforming to the standard (gradation characteristic) of the input image data. Then each over-range pixel is displayed at a predetermined color. An over-range pixel refers to a pixel which has a brightness related value that is higher (greater) than the maximum value of the plurality of brightness related values belonging to the specified display range. For example, a pixel having such a brightness related value is displayed as white (blank dot).

Figure 2A:
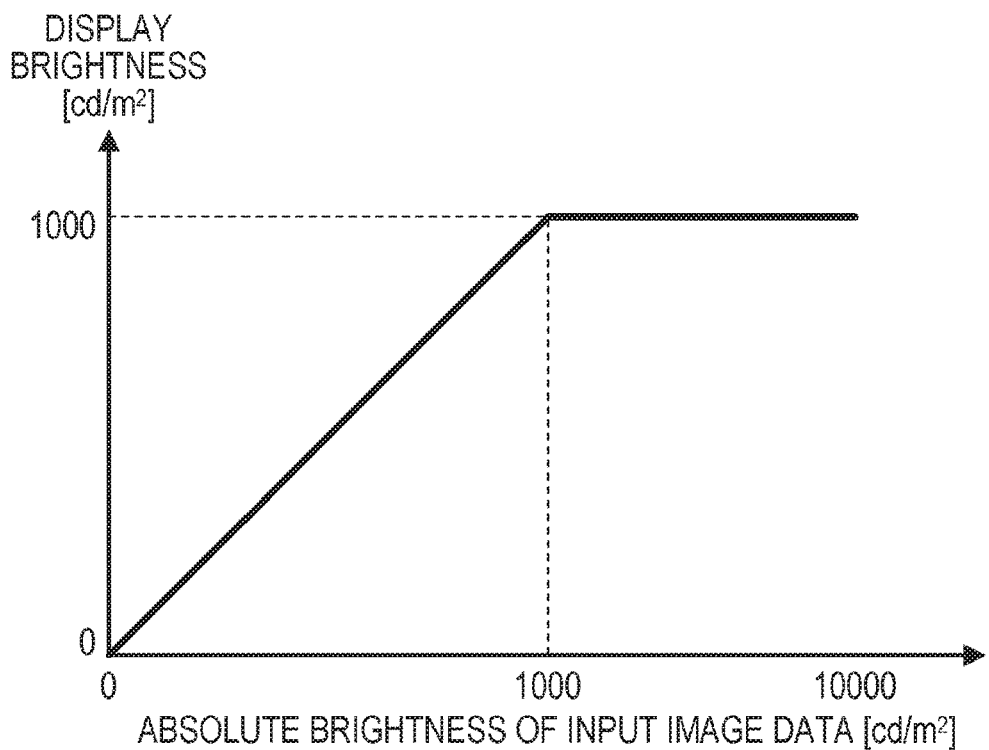
FIG. 2A and FIG. 2B are graphs depicting examples of a range conversion processing according to this embodiment.
Figure 2B:
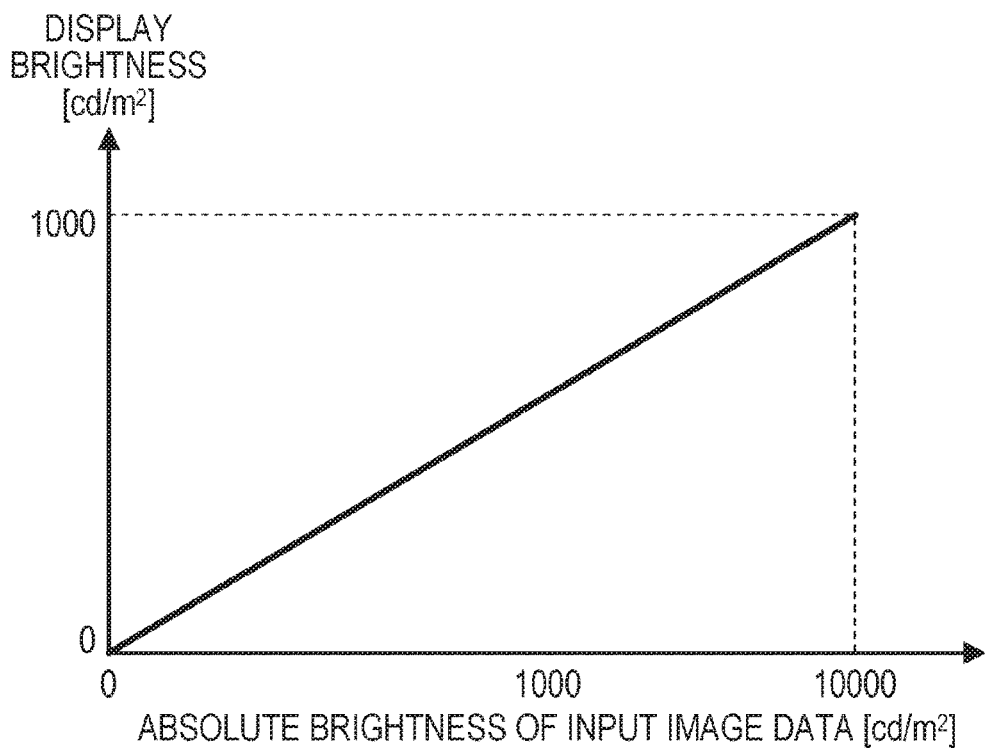

Here a case when the gradation characteristic of the input image data is ST 2084, and the maximum brightness of a plurality of absolute brightness values belonging to the specified display range is 1000 $cd/m^2$ is considered. ST 2084 defines the absolute brightness in a 0 to 10,000 $cd/ms^2$ range. This embodiment can implement only a 0 to 1000 $cd/m^2$ display brightness (brightness on the screen) In this case, the input image data is corrected so that an absolute brightness not higher than 1000 $cd/m^2$ (absolute brightness defined in ST 2084) is directly displayed, and an absolute brightness higher than 1000 $cd/m^2$ is displayed at 1000 $cd/m^2$ (FIG. 2A). Next a case when the gradation characteristic of the input image data is ST 2084, and when the maximum brightness value of a plurality of absolute brightness values belonging to the specified display range is 10,000 $cd/m^2$ is considered. In this case, the input image data is corrected and displayed so that the range, including the absolute brightness in a 0 to 10,000 $cd/m^2$ range (absolute brightness defined in ST 2084), is compressed to the range including the display brightness in a 0 to 1000 $cd/m^2$ range (FIG. 2B).

The method for determining the gradation characteristic of the input image data is not especially limited. For example, the characteristic information related to the gradation characteristic of the input image data may be included in the meta data attached to the input image data. Then the image processing unit 102 may determine the gradation characteristic of the input image data in accordance with the characteristic information acquired from the meta data of the input image data (characteristic determination processing). The image processing unit 102 may automatically determine the gradation characteristic of the input image data in accordance with the type of the input image data (e.g. medical image, illustration image, landscape image). The image processing unit 102 may automatically determine the gradation characteristic of the input image data in accordance with the operating environment of the display apparatus 100 (image processing apparatus). The operating environment of the display apparatus 100 includes the temperature of the display apparatus 100, the ambient brightness of the display apparatus 100 and the like.

For the characteristic information, information representing the correspondence between the pre-conversion gradation value and the converted gradation value in the gradation conversion processing, for example, may be used. Also for the characteristic information, information representing the correspondence between the pre-conversion gradation value and the converted gradation value, in the gradation conversion processing already performed on the input image data, may be used. If the brightness (absolute brightness or relative brightness) is corresponded to the pixel value, such as ST 2084 and Log, the information representing the correspondence between the pixel value of the image data and the brightness of the image data, may be used as the characteristic information. In EOTF, the input value is a pixel value, and the output value is the brightness. On the other hand, information, in which the input value is the brightness and the output value is the pixel value (e.g. function, table), is called "opto-electronic transfer function (OETF)". If the brightness is corresponded to the pixel value, then EOTF, OETF or the like may be used as the characteristic information.

The method of determining the specified display range (maximum value of a plurality of brightness related values belonging to the specified display range) is not especially limited. For example, the range information, to indicate the specified display range, may be included in the meta data of the input image data. Then the image processing unit 102 may determine the specified display range in accordance with the range information. Further, the image processing unit 102 may automatically determine the specified display range in accordance with the type of the input image data. The image processing unit 102 may automatically determine the specified display range in accordance with the operating environment of the display apparatus 100 (image processing apparatus).

The gradation characteristic of the input image data, the dynamic range of the input image data, the range of the display brightness, the image processing performed by the image processing unit 102, the brightness related value and the like are not especially limited. For example, various gradation characteristics that are proposed may be used as the gradation characteristics of the input image data. The range of the display brightness may be wider or narrower than 0 to 1000 cd/m$^2$ range. The range conversion processing may be omitted in at least one of the cases when the gradation characteristic of the input image data is ST 2084, and when the gradation characteristic of the input image data is Log. The range conversion processing may be performed in the case when the gradation characteristic of the input image data is gamma 2.2. The image processing unit 102 may omit the gradation conversion processing. For the input image data, the image data after the image processing unit 102 performed gradation conversion processing may be acquired.

The color conversion processing unit 103 converts the colors of the processing image data outputted from the image processing unit 102 using a color conversion parameter generated by the color conversion parameter generating unit 107 (color conversion processing). Thereby the display image data (converted image data) is generated. The color conversion processing unit 103 outputs the display image data to the display unit 104. The color conversion can be regarded as "coloration", and the color conversion processing can be regarded as "coloration processing". The color conversion parameter is, for example, a table that indicates the converted color (color after conversion in the color conversion processing) for each pixel of the processing image data. The color conversion processing unit 103 may generate the display image data by performing the color conversion processing on the input image data instead of the processing image data.

The display unit 104 displays an image on the screen based on the display image data outputted from the color conversion processing unit 103. For the display unit 104, a spontaneous light emitting type display panel, a combination of a light emitting unit and a modulation panel or the like can be used. The spontaneous light emitting type display panel displays an image on the screen by emitting light based on the display image data. The light emitting unit irradiates light to the modulation panel. Then the modulation panel displays an image on the screen by modulating (e.g. transmitting, reflecting) the light emitted from the light emitting unit, based on the display image data. The light emission (e.g. emission brightness, emission color) of the light emitting unit may be controlled based on the display image data. In the case of the transmission type liquid crystal display apparatus, the light emitting unit is called a "backlight unit", and the modulation panel is called a "liquid crystal panel". The backlight unit irradiates light to the rear face of the liquid crystal panel. The liquid crystal panel displays an image on the screen by transmitting the light emitted from the backlight unit.

The CPU 105 controls the operation of the display apparatus 100 (each function unit of the display apparatus 100). For example, the display apparatus 100 includes a storage unit (e.g. non-volatile memory) which stores a program, and the CPU 105 reads the program from the storage unit and executes the program, whereby the operation of the display apparatus 100 is controlled.

The UI unit 106 receives the user operation that the user performed to the display apparatus 100 (image processing apparatus). Then the UI unit 106 outputs the operation signal received in accordance with the user operation to other functional units (e.g. image processing unit 102, color conversion processing unit 103, CPU 105, color conversion parameter generating unit 107) of the display apparatus 100. The UI unit 106 is, for example, buttons disposed on the display apparatus 100, a touch panel disposed on the display unit 104 or the like. A control unit that is detachable from the display apparatus 100 (e.g. controller, keyboard, mouse) may be used as the UI unit 106.

The UI unit 106 is used for such user operations as the characteristic setting operation, the range setting operation, and the color conversion setting operation. The characteristic setting operation is a user operation to determine the gradation characteristic of the input image data. For example, the characteristic setting operation is a user operation to specify the gradation characteristic, a user operation to specify the operation mode of the display apparatus 100 (image processing apparatus) and the like. The range setting operation is a user operation to determine the specified display range. For example, the range setting operation is a user operation to specify the specified display range, a user operation to specify the maximum value of a plurality of brightness related values belonging to the specified display range, a user operation to specify the operation mode of the display apparatus 100 and the like. The color conversion setting operation is a user operation to determine whether the color conversion processing is executed. For example, the color conversion setting operation is a user operation to determine whether or not the color conversion processing is executed, a user operation to specify the operation mode of the display apparatus 100 and the like.

In this embodiment, the setting to specify whether the color conversion processing is called a "false color setting".

The color conversion parameter generating unit 107 switches the state of the false color setting between the ON state and the OFF state in accordance with the color conversion setting operation. The ON state is a state to execute the color conversion processing, and the OFF state is a state to not execute the color conversion processing. Selecting the state of the false color setting determines whether the color conversion processing is executed or not. For example, the color conversion processing unit 103, the color conversion parameter generating unit 107, or both of these units select the state of the false color setting in accordance with the color conversion setting operation.

In the range setting operation to specify the maximum value of a plurality of brightness related values belonging to the specified display range, the type of the brightness related values is not especially limited. For example, the user operation, to specify the maximum value using the brightness gradation value, may be performed as the range setting operation, regardless the gradation characteristic of the input image data. However, in terms of convenience, it is preferable that the user operation to specify a type of brightness gradation value in accordance with the gradation characteristic of the input image data is performed as the range setting operation. For example, if the gradation characteristic of the input image data is ST 2084, it is preferable that the user operation to specify the absolute brightness is performed as the range setting operation. If the gradation characteristic of the input image data is Log, it is preferable that the user operation to specify the relative brightness is performed as the range setting operation.

The color conversion parameter generating unit 107 generates the color conversion parameter based on the information representing the correspondence between the brightness related value (brightness level) of the input image data and the converted color of the color conversion processing, and the input image data. For example, as mentioned above, the table indicating the converted color of each pixel is generated as the color conversion parameter. Then the color conversion parameter generating unit 107 outputs the generated color conversion parameter to the color conversion processing unit 103. Thereby in the color conversion processing, each color of the processing image data is converted based on the correspondence. In this embodiment, the color conversion parameter generating unit 107 uses the correspondence in accordance with the determined gradation characteristic of the input image data. Hence the brightness distribution of the input image data can be displayed more appropriately. For example, if the gradation characteristic of the input image data is gamma 2.2, the correspondence of the converted color and the brightness generation value of the input image data is used. If the gradation characteristic of the input image data is ST 2084, the correspondence of the converted color and the absolute value of the input image data is used. If the gradation characteristic of the input image data is Log, the correspondence of the converted color and the relative brightness of the input image data is used. In other words, the color conversion parameter generating unit 107 switches the correspondence between the brightness level and the converted color in accordance with the gradation characteristic.

The gradation characteristic of the input image data is determined by the color conversion parameter generating unit 107. Both the image processing unit 102 and the color conversion parameter generating unit 107 may determine the gradation characteristic of the input image data respectively. In the same manner, the specified display range (maximum value of a plurality of brightness related values belonging to the specified display range) may be determined by the color conversion parameter generating unit 107. Both the image processing unit 102 and the color conversion parameter generating unit 107 may determine the specified display range respectively.

Figure 3:
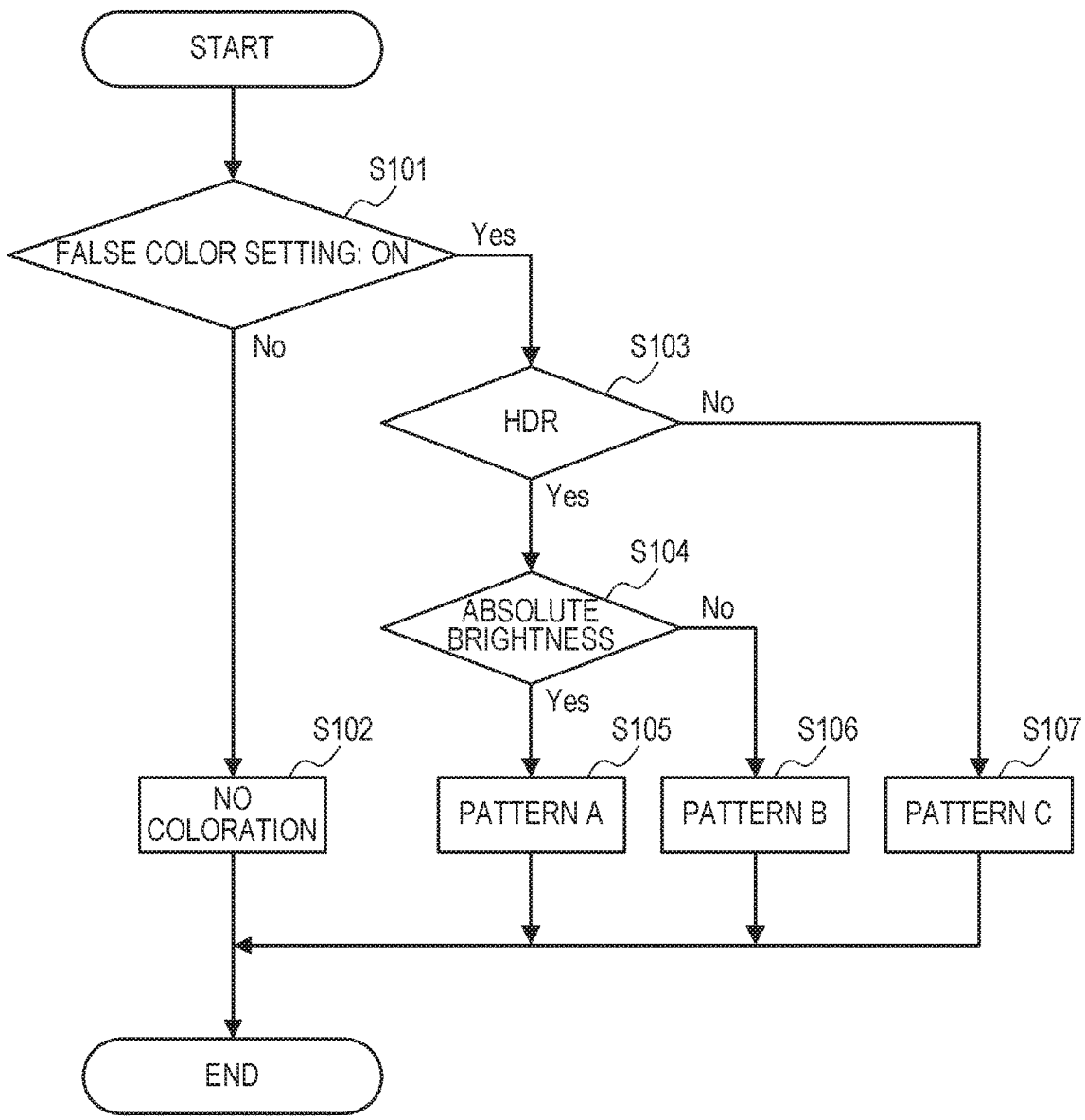
FIG. 3 is a flow chart depicting an example of a processing flow by a color conversion parameter generating unit according to this embodiment.

An example of the processing flow by the color conversion parameter generating unit 107 will be described with reference to the flow chart in FIG. 3.

First in S101, the color conversion parameter generating unit 107 determines whether the state of the false color setting is the ON state. If the state of the false color setting is the OFF state (S101: NO), processing advances to S102, and if the state of the false color setting is the ON state (S101: YES), processing advances to S103.

In S102, the color conversion parameter generating unit 107 selects "no coloration" as the pattern of the correspondence between the brightness related value of the input image data and the converted color.

In S103, the color conversion parameter generating unit 107 determines whether the gradation characteristic of the input image data corresponds to HDR. If the gradation characteristic of the input image data does not correspond to HDR (S103: NO), processing advances to S107, and if the gradation characteristic of the input image data corresponds to HDR (S103: YES), processing advances to S104. In concrete terms, if the gradation characteristic of the input image data is gamma 2.2, it is determined that the gradation characteristic of the input image data corresponds to SDR, and processing advances to S107. If the gradation characteristic of the input image data is ST 2084 or Log, it is determined that the gradation characteristic of the input image data corresponds to HDR, and processing advances to S104.

In S107, the color conversion parameter generating unit 107 selects "pattern C" as the pattern of the correspondence between the brightness related value of the input image data and the converted color.

In S104, the color conversion parameter generating unit 107 determines whether the absolute brightness is defined in the gradation characteristic of the input image data. If the absolute brightness is defined in the gradation characteristic of the input image data (S104: YES), processing advances to S105. If the absolute brightness is not defined in the gradation characteristic of the input image data, but the relative brightness is defined in the gradation characteristic of the input image data (S104: NO), processing advances to S106. In concrete terms, if the gradation characteristic of the input image data is ST 2084, processing advances to S105, and if the gradation characteristic of the input image data is Log, processing advances to S106.

In S105, the color conversion parameter generating unit 107 selects "pattern A" as the pattern of the correspondence between the brightness related value of the input image data and the converted color. In S106, the color conversion parameter generating unit 107 selects "pattern B" as the pattern of the correspondence between the brightness related value of the input image data and the converted color.

If "no coloration" is selected, the color conversion parameter generating unit 107 generates a color conversion parameter to not convert the color of the processing image data. As a result, in the color conversion processing unit 103, the display image data, which is the same as the processing image data, is generated by the color conversion processing. The color conversion parameter to not convert the color of the processing image data can be regarded as a "color conversion parameter of which converted color is the same as the pre-conversion color". If the state of the false color setting is the OFF state, the generation of the color conversion parameter may be omitted. Then the color conversion processing unit 103 may omit the color conversion processing, and output the processing image data as the display image data.

In this embodiment, the color of each over-range pixel is converted into a predetermined color (e.g. white) by the image processing of the image processing unit 102. An over-range pixel refers to a pixel which has a brightness related value that is higher (greater) than the maximum value of a plurality of brightness related values belonging to the specified display range. If "no coloration" is selected, the color of the processing image data is not converted, and the color of the over-range pixel is maintained at the predetermined color. If one of pattern A, pattern B and pattern C is selected, on the other hand, the color of the processing image data is converted based on the correspondence between the brightness related value of the input image data and the converted color. Therefore the color of the over-range pixel is also converted into a color based on the correspondence between the brightness related value of the input image data and the converted color.

Figure 4A:
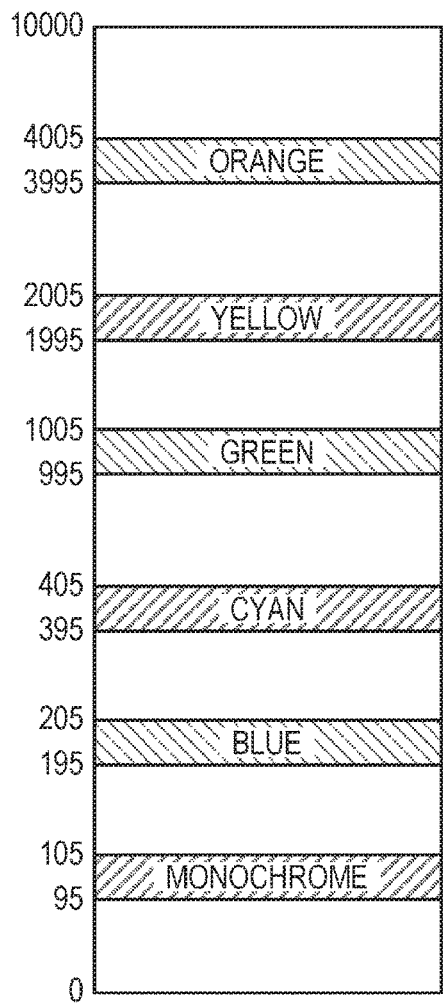
FIG. 4A and FIG. 4B are diagrams depicting examples of a correspondence (correspondence of the absolute brightness and the color) according to this embodiment.
Figure 4B:
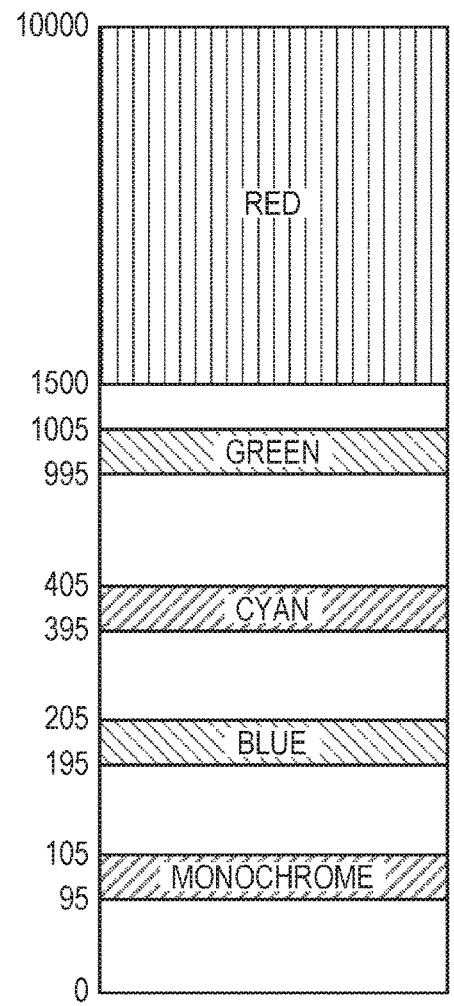

If the pattern A is selected, the color conversion parameter generating unit 107 determines a correspondence depicted in FIG. 4A or FIG. 4B in accordance with the specified display range (maximum brightness value of a plurality of absolute brightness values belonging to the specified display range).

FIG. 4A is a case when the maximum brightness value of a plurality of absolute brightness values belonging to the specified display range is 10,000 cd/m². In other words, in the case of FIG. 4A, the specified display range includes all the absolute brightness values in a 0 to 10,000 cd/m² range defined by ST 2084.

In the correspondence in FIG. 4A, a plurality of converted colors are corresponded to a plurality of ranges (color conversion ranges) of the absolute brightness respectively. For example, a monochrome color (gray) corresponds to the color conversion range to which the 95 to 105 cd/m² absolute brightness belongs. Therefore the colors in the portions (pixels) which has a 95 to 105 cd/m² absolute brightness are converted into a monochrome color. Green is corresponded to the color conversion range to which the 995 to 1005 cd/m² absolute brightness belongs. Further, in the correspondence in FIG. 4A, a plurality of color conversion ranges are separated from each other, and a range, to which a converted color is not corresponded (non-color conversion range), exists between the two color conversion ranges. In the color conversion processing, colors of the pixels having an absolute brightness belonging to the non-color conversion range are not converted.

By using the correspondence in FIG. 4A, the distribution of the absolute brightness belonging to each color conversion range is displayed as color. As mentioned above, in the case of the correspondence in FIG. 4A, the plurality of color conversion ranges are separated from each other. Therefore the distribution of the absolute brightness belonging to the color conversion range is displayed as a color line.

FIG. 4B is a case when the maximum brightness value of a plurality of absolute brightness values belonging to the specified display range is 1500 cd/m². In other words, in the case of FIG. 4B, the specified display range includes a 0 to 1500 cd/m² absolute brightness, and does not include an absolute brightness exceeding 1500 cd/m².

In the correspondence in FIG. 4B, the same setting (color conversion range, non-color conversion range, correspondence between color conversion range and converted color) as FIG. 4A is performed for the specified display range.

Therefore if the correspondence in FIG. 4B is used, the same result as the case of using the correspondence in FIG. 4A is acquired as the result of the color conversion processing for pixels having the absolute brightness values belonging to the specified display range.

Further, in the correspondence in FIG. 4B, a color that is different from the plurality of converted colors, which correspond to the plurality of color conversion ranges respectively, is corresponded to the non-specified display range. In concrete terms, red is corresponded to the non-specified display range. Therefore the color of a pixel having the absolute brightness belonging to the non-specified display range is converted to red by the color conversion processing. The non-specified display range is a range outside the specified display range. In the case of FIG. 4B, the non-specified display range is a range of which absolute brightness value is higher than 1500 cd/m² (maximum brightness value of a plurality of absolute brightness values belonging to the specified display range).

If the pattern A is selected in this way, the correspondence in which the converted color is corresponded to the absolute brightness is used, and color conversion processing is performed based on the absolute brightness. Thereby the absolute brightness (distribution of absolute brightness) of the input image data can be appropriately displayed by colors. As a result, the user can easily recognize the absolute brightness of the input image data by colors. For example, in the case of FIG. 4A and FIG. 4B, the absolute brightness at the center of the color conversion range has a round number value (e.g. 100 cd/m², 200 cd/m², 400 cd/m², 1000 cd/m², 2000 cd/m², 4000 cd/m²). Therefore an absolute brightness having a round number value can be appropriately displayed by colors. As a result, the user can easily recognize the absolute brightness having a round number value by colors. 100 cd/m², 200 cd/m², 400 cd/m², 1000 cd/m², 2000 cd/m², 4000 cd/m² can be regarded as a plurality of boundaries of a plurality of sub-ranges constituting the range of the possible absolute brightness of the input image data. The plurality of color conversion ranges can be regarded as a plurality of boundary ranges which includes a plurality of boundaries respectively.

In the correspondences in FIG. 4A and FIG. 4B, a plurality of color conversion regions are separated from each other, and the distribution of the absolute brightness values belonging to the color conversion range is displayed as a contour line. Therefore for the image region in the non-color conversion range, the user can confirm the processing image (image represented by the processing image data). In other words, the user can confirm the brightness distribution and the processing image simultaneously.

A converted color that is different from the plurality of converted colors, corresponding to the plurality of color conversion ranges respectively, is corresponded to the non-specified display range. Therefore the image region in the non-specified display range is displayed with a color that is different from the colors in the image regions in the color conversion ranges. Thereby the user can discern the image region in the non-specified display range and the image region in the color conversion range.

In the non-specified display range, the brightness of the converted color may continuously change in accordance with the continuous change of the absolute brightness (brightness related values). Then the color of each pixel having the absolute brightness value belonging to the non-specified display range is converted into a color of which brightness continuously changes in accordance with the continuous change of the absolute brightness. As a result, in the image region in the non-specified display range, gradation display is performed as the display of the converted color, where the brightness of the converted color continuously changes in accordance with the continuous change of the absolute brightness. According to this gradation display, the user can easily recognize the distribution of the absolute brightness in the image region that is within the non-specified display range.

The color conversion range in FIG. 4A and FIG. 4B has a 10 cd/m² width, but the position of the color conversion range, the width of each color conversion range, the number of color conversion ranges and the like are not especially limited. Each color that is corresponded to the color conversion range, the non-specified display range or the like is not especially limited either. However it is preferable that a color which is not used for the other color conversion processing is used as the converted color.

If a pixel having an absolute brightness value belonging to the color conversion range is not included in the input image data, the conversion into a color corresponding to this color conversion range is not performed. Therefore it is preferable that the color conversion parameter generating unit 107 determines a plurality of color conversion ranges, so that the number of pixels having a brightness related value belonging to the color conversion range in the input image data is at least a predetermined number for each of the plurality of color conversion ranges. For example, it is preferable that the color conversion parameter generating unit 107 adjusts at least one of the initial values of the center of the color conversion range, the width of the color conversion range and the like, so that the number of pixels having a brightness value belonging to the color conversion range becomes at least a predetermined number.

Figure 5A:
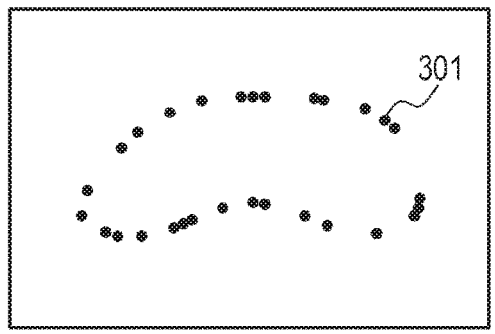
FIG. 5A and FIG. 5B are diagrams depicting an example of a processing result by the color conversion processing unit according to this embodiment.
Figure 5B:
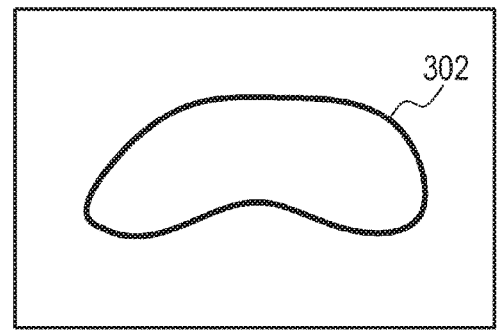

In some cases, a plurality of image regions, of which converted colors are the same and of which the respective size is a predetermined size or less, may have scattered like image noise (FIG. 5A). Therefore it is preferable that the color conversion processing unit 103 further converts the colors of the image regions among a plurality of image regions, so that the color of the linear image region connecting a plurality of image regions having image noise becomes the same color as the converted color of this plurality of image regions (FIG. 5B). In FIG. 5A, a plurality of scattered pixels 301 are a plurality of pixels converted into a same color by the color conversion processing. By further converting the color of the pixels among the plurality of pixels 301, a noise-like display can be suppressed, and the linear region (linear image region) 302 in FIG. 5B can be displayed as an image region having the same color as the pixel 301. The predetermined size may be one pixel size, or may be a size of a plurality of pixels.

If the pattern B is selected, the color conversion parameter generating unit 107 determines the correspondence depicted in FIG. 6A or FIG. 6B in accordance with the specified display range (maximum brightness value of a plurality of relative brightness values belonging to the specified display range).

FIG. 6A is an example when the maximum brightness value of a plurality of relative brightness values belonging to the specified display range is 1600%. In Log, the relative brightness in the 0% to 1600% range is defined. In other words, in the case of FIG. 6A, the specified display range includes all the relative brightness values in the 0% to 1600% range defined in Log.

In the correspondence in FIG. 6A, a plurality of converted colors correspond to a plurality of ranges (color conversion ranges) of the relative brightness respectively. For example, a monochrome color is corresponded to the color conversion range to which the relative brightness values in a 0% to 100% range belong. In other words, a monochrome color is corresponded to the range of a relative brightness that is 100% or less (threshold or less). And green is corresponded to the color conversion range to which the relative brightness values in a 400% to 800% range belong.

FIG. 6B is an example when the maximum brightness value of a plurality of relative brightness values belonging to the specified display range is 400%. In other words, in the case of FIG. 6B, the specified display range includes relative brightness values in a 0% to 400% range, and does not include a relative brightness values higher than 400%. In the correspondence in FIG. 6B, a converted color, which is different from the plurality of converted colors corresponding to the plurality of color conversion ranges respectively, is corresponded to the non-specified display range. In concrete terms, red is corresponded to the non-specified display range. Therefore the color of the pixel having the absolute brightness value belonging to the non-specified display range is converted into red by the color conversion processing. In the case of FIG. 6B, the non-specified display range is a range of which relative brightness is higher than 400% (maximum brightness value of a plurality of relative brightness values belonging to the specified display range).

If the pattern A is selected, the position (center) of the color conversion range is fixed, regardless the specified display range, as illustrated in FIG. 4A and FIG. 4B. The number of color conversion ranges changes in accordance with the specified display range. On the other hand, even if the color of the relative brightness changes depending on the specified display range, the user can easily recognize the relative brightness. Therefore, as illustrated in FIG. 6A and FIG. 6B, if the pattern B is selected, the color conversion parameter generating unit 107 changes at least the positions of the color conversion ranges in accordance with the specified display range (maximum brightness value of a plurality of relative brightness values belonging to the specified display range). In the case of FIG. 6A and FIG. 6B, the positions of the color conversion ranges and the width of each color conversion range are changed in accordance with the specified display range, so that the number of the plurality of the color conversion ranges, the relationship between the plurality of color conversion ranges and the plurality of converted colors and the like are maintained. In other words, in the case of FIG. 6A and FIG. 6B, the plurality of color conversion ranges are generally compressed or expanded in accordance with the specified display range.

In this way, if the pattern B is selected, the correspondence of the relative brightness is used, and the color conversion processing is performed based on the relative brightness. Thereby the relative brightness (distribution of the relative brightness) of the input image data can be appropriately displayed by colors. As a result, the user can easily recognize the relative brightness of the input image data by colors. In this embodiment, the number of the plurality of color conversion ranges, the relationship between a plurality of color conversion ranges and a plurality of colors and the like are maintained, hence the relative brightness can be more appropriately displayed, and the user can more clearly recognize the relative brightness. Further, in the image region of the non-specified display range, a color that is different from those in the image regions of the color conversion ranges is displayed. Thereby the user can easily discern the image region of the non-specified display range and the image region of the color conversion range.

In a range (at least one of the color conversion range and the non-specified display range), the brightness of the converted color may continuously change in accordance with the continuous change of the relative brightness (brightness related values). Then in the image region in this range, gradation display can be performed as the display of the converted colors, such that the brightness of the converted colors continuously change in accordance with the continuous change of the relative brightness. As a result, the user can easily recognize the distribution of the relative brightness in the image region in this range.

Figure 8:
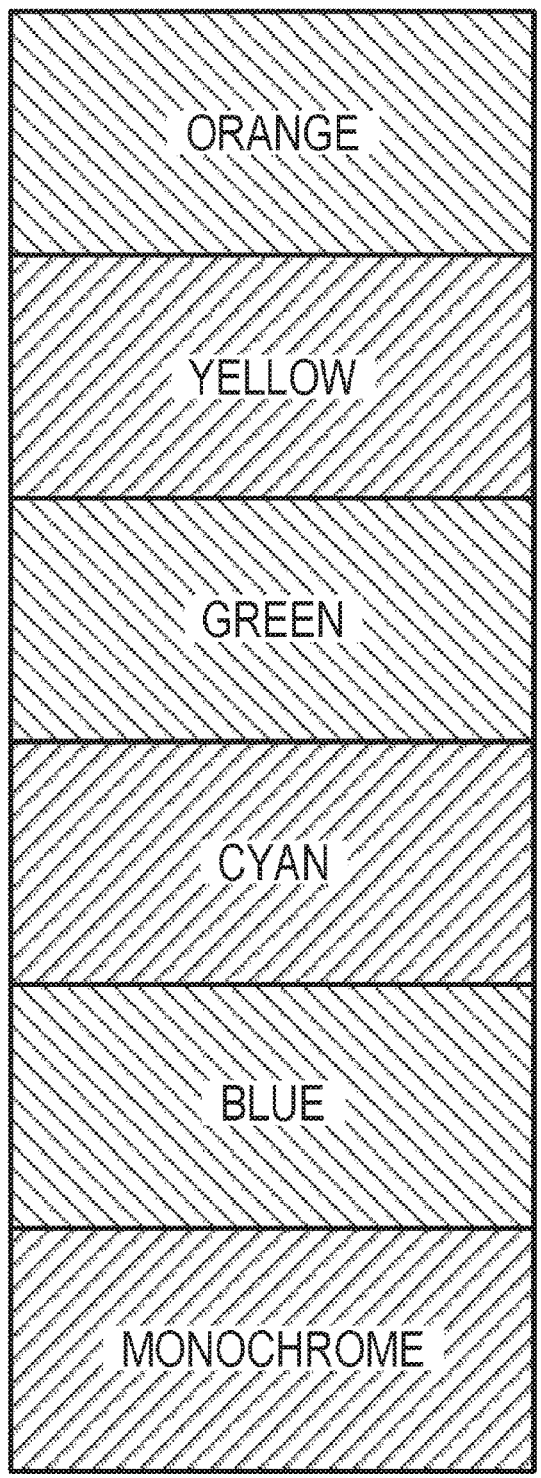
FIG. 8 is an example of a correspondence (correspondence of the brightness gradation value and the color) according to this embodiment.

If the pattern C is selected, the color conversion parameter generating unit 107 determines the correspondence depicted in FIG. 8. In the correspondence in FIG. 8, a plurality of converted colors are corresponded to a plurality of ranges (color conversion ranges) of the brightness gradation values respectively. For example, a monochrome color is corresponded to the color conversion range to which the brightness gradation values in a 0 to 171 range belongs. Green corresponds to a color conversion range that is within the brightness gradation values 512 to 683.

In this way, if the pattern C is selected, the correspondence of the converted color and the brightness gradation value is used, and the color conversion processing is performed based on the brightness gradation value. Thereby the brightness gradation values (distribution of the brightness gradation values) of the input image data can be appropriately displayed by colors. As a result, the user can easily recognize the brightness gradation values of the input image data by colors.

In a range (e.g. color conversion range), the brightness of the converted color may continuously change in accordance with the continuous change of the brightness gradation values (brightness related values). Then in the image region in this range, gradation display can be performed as the display of the converted colors, such that the brightness of the converted colors continuously change in accordance with the continuous change of the brightness gradation values. As a result, the user can easily recognize the distribution of the relative brightness in the image region in this range.

In the correspondences in FIG. 6A, FIG. 6B and FIG. 8, the non-color conversion range is not set, instead a plurality of continuous color conversion ranges are set, however the present invention is not limited to this. For example, at least one of the case when the gradation characteristic of the input image data is gamma 2.2, and the case when the gradation characteristic of the input image data is Log, a plurality of color conversion ranges, which are separated from each other, may be set. Further, in the case when the gradation characteristic of the input image data is ST 2084, a plurality of continuous color conversion ranges may be set.

In the case when the gradation characteristic of the input image data is gamma 2.2, the specified display range (maximum value of a plurality of brightness gradation values belonging to the specified display range) may be determined. Then a converted color, which is different from a plurality of converted colors corresponding to a plurality of color conversion ranges respectively, may be corresponded to the non-specified display range. In the non-specified display range, the brightness of the converted color may continuously change in accordance with the continuous change of the brightness gradation values. In at least one of the case when the gradation characteristic of the input image data is gamma 2.2, and the case when the gradation characteristic of the input image data is ST 2084, the positions of the color conversion ranges, the width of each color conversion range and the like may depend on the specified display range. Further, in at least one of the case when the gradation characteristic of the input image data is gamma 2.2, and the case when the gradation characteristic of the input image data is Log, the positions of the color conversion ranges, the width of each color conversion range and the like need not depend on the specified display range. Furthermore, in at least one of the case when the gradation characteristic of the input image data is gamma 2.2, and the case when the gradation characteristic of the input image data is Log, the number of color conversion ranges and the like may depend on the specified display range.

A range of the brightness related values, which are lower than a threshold, may be set as the non-color conversion range. For example, in at least one of the case when the gradation characteristic of the input image data is ST 2084, and the case when the gradation characteristic of the input image data is Log, the range corresponding to SDR may be set as the non-color conversion range. In concrete terms, when the gradation characteristic of the input image data is ST 2084, the absolute brightness in a 0 to 100 $cd/m^2$ range may be set as the non-color conversion range corresponding to SDR. When the gradation characteristic of the input image data is Log, the relative brightness range in a 0% to 100% range may be set as the non-color conversion range corresponding to SDR.

The color conversion parameter generating unit 107 may determine the non-color conversion range, in accordance with the user operation to the display apparatus 100 (image processing apparatus). For example, the color conversion parameter generating unit 107 may determine the above mentioned threshold in accordance with the user operation (second threshold determination processing). The user operation to determine the non-color conversion range, the threshold and the like is a user operation to specify the brightness related value, for example. In the user operation to specify the brightness related value, the type of the brightness related value is not especially limited. For example, the user operation to specify the brightness gradation value may be performed as the user operation to determine the non-color conversion range, the threshold or the like, regardless the gradation characteristic of the input image data. However, in terms of convenience, it is preferable that the user operation to specify a type of brightness gradation value in accordance with the gradation characteristic of the input image data is performed as the user operation to determine the non-color conversion range, the threshold or the like.

FIG. 7A to FIG. 7C are other examples of the correspondence of the pattern A. In the case of FIG. 7A, the specified display range includes all the absolute brightness values in a 0 to 10,000 $cd/m^2$ range defined in ST 2084. In the correspondence in FIG. 7A, a plurality of converted colors are corresponded to a plurality of ranges (color conversion ranges) of the absolute brightness respectively. In the correspondence of FIG. 7A, the converted color, of which brightness continuously changes in accordance with the continuous change of the absolute brightness, is corresponded to each color conversion range. For example, a monochrome color, of which brightness continuously changes in accordance with the continuous change of the absolute brightness, is corresponded to the color conversion range to which the absolute brightness in a 0 to 100 $cd/m^2$ range belongs. Green, of which brightness continuously changes in accordance with the continuous change of the absolute brightness, is corresponded to the color conversion range to which the absolute brightness in a 400 to 1,000 cd/m² range belongs. Therefore in the image region in the color conversion range, gradation display can be performed as the display of the converted colors, such that the brightness of the converted colors continuously change in accordance with the continuous change of the absolute brightness.

In the case of FIG. 7B, the specified display range includes an absolute brightness in a 0 to 1500 cd/m² range, and does not include the absolute brightness higher than 1500 cd/m². The non-specified display range is a range of the absolute brightness higher than 1500 cd/m². In the correspondence in FIG. 7B, the same settings as FIG. 7A (color conversion ranges, correspondence between the color conversion range and the converted color) are performed for the specified display ranges. In other words, the position of each color conversion range does not depend on the specified display range, but is fixed, and the number of color conversion ranges changes in accordance with the specified display range. A converted color, which is different from a plurality of converted colors corresponding to a plurality of color conversion ranges respectively, is corresponded to the non-specified display range. A converted color, of which brightness continuously changes in accordance with the continuous change of the absolute brightness, is corresponded to the non-specified display range as well. In concrete terms, red, which brightness continuously changes in accordance with the continuous change of the absolute brightness, is corresponded to the non-specified display range.

In the case of FIG. 7C, the absolute brightness in a 0 to 100 cd/m² range is set as the non-color conversion range corresponding to SDR. The rest is the same as FIG. 7B. In other words, the position of each color conversion range does not depend on the non-color conversion range, which is a range of the brightness related values that are lower than the threshold, but is fixed, and the number of color conversion ranges changes in accordance with this non-color conversion range.

A correspondence using the relative brightness, instead of the absolute brightness in FIG. 7A to FIG. 7C, may be used as the correspondence of the pattern B. A correspondence using the brightness gradation values, instead of the absolute brightness in FIG. 7A to FIG. 7C, may be used as the correspondence of the pattern C.

As described above, according to this embodiment, the correspondence in accordance with the gradation characteristic of the input image data is used as the correspondence between the brightness related value and the converted color. Thereby the brightness distribution of the input image data can be displayed even more appropriately.

Each functional unit of this embodiment described above may or may not be independent hardware. The functions of at least two functional units may be implemented by common hardware. Each of a plurality of functions of one functional unit may be implemented by independent hardware. At least two functions of one functional unit may be implemented by common hardware. Each functional unit may or may not be implemented by hardware. For example, the apparatus may include a processor and a memory in which a control program is stored. Then the functions of at least a part of the functional units of the apparatus may be implemented by the processor, which reads the control program from the memory, and executes the control program.

The above mentioned embodiment is merely an example, and a configuration that can be implemented by appropriately modifying or changing the configuration of this embodiment, within the scope of the essential content of the present invention, is also included in the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-038271, filed on Mar. 1, 2017, and Japanese Patent Application No. 2017-228015, filed on Nov. 28, 2017, which are hereby incorporated by reference herein in their entirety.

What is claimed is:

1. An image processing apparatus, comprising:
    a storage configured to store information indicating a plurality of colors, wherein the plurality of colors is related to a plurality of sub-ranges consisting a dynamic range of an input image, respectively, and
    at least one processor and/or at least one circuit to perform the operations of the following units:
    a converting unit configured to convert colors of the input image based on the information, wherein for each of the plurality of sub-ranges, the converting unit colors regions, in which brightness levels of the input image are included in one of the plurality of sub-ranges, with a color related to the one of the plurality of sub-ranges; and
    a setting unit configured to set one of gradation characteristics including a first gradation characteristic in which gradation values are related to brightness levels represented with absolute brightness, and a second gradation characteristic in which gradation values are related to brightness levels represented with relative brightness, wherein in a case that the setting unit sets the first gradation characteristic, for each of a plurality of first sub-ranges, the converting unit colors regions, in which brightness levels of the input image are included in one of the plurality of first sub-ranges, with a color related to the one of the plurality of first sub-ranges, the first sub-ranges being obtained by dividing the dynamic range with thresholds represented with absolute brightness; and in a case that the setting unit sets the second gradation characteristic, for each of plurality of second sub-ranges, the converting unit colors regions, in which brightness levels of the input image are included in one of the plurality of second sub-ranges, with a color related to the one of the plurality of second sub-ranges, the second sub-ranges being obtained by dividing the dynamic range with thresholds represented with relative brightness.

2. The image processing apparatus according to claim 1, wherein
the setting unit sets the gradation characteristic in accordance with an instruction inputted by the user.

3. The image processing apparatus according to claim 1, wherein
the setting unit sets the gradation characteristic based on meta data attached to the input image.

4. The image processing apparatus according to claim 1, wherein the first gradation characteristic is PQ defined in ST 2084.

5. The image processing apparatus according to claim 1, wherein
the second gradation characteristic is a gradation characteristic in which a relative brightness level is corresponded to a gradation value.

6. The image processing apparatus according to claim 1, wherein
the converting unit converts a color of a region of the input image into monochrome, brightness levels of this region of the input image being equal to or less than a first threshold.

7. The image processing apparatus according to claim 1, wherein
the at least one processor and/or at least one circuit further performs the operations of a gradation converting unit configured to convert the input image based on the set gradation characteristic.

8. The image processing apparatus according to claim 1, wherein
the converting unit converts a color of a region of the input image into a predetermined color,
brightness levels of this region of the input image being higher than a second threshold.

9. The image processing apparatus according to claim 8, wherein
the second threshold is a brightness level specified by the user.

10. The image processing apparatus according to claim 1, wherein
the information is information for which a different color is corresponded to each of the plurality of sub-ranges constituting a range of possible brightness levels of the input image.

11. The image processing apparatus according to claim 1, wherein the converting unit performs color conversion on the input image such that brightness of an image after the color conversion changes in accordance with change of the brightness level of the input image, in each of the plurality of sub-ranges.

12. An image processing method, comprising:

a converting step of converting colors of an input image based on information indicating a plurality of colors, wherein the plurality of colors is related to a plurality of sub-ranges consisting a dynamic range of the input image, respectively, wherein in the converting step, for each of the plurality of sub-ranges, regions, in which brightness levels of the input image are included in one of the plurality of sub-ranges, are colored with a color related to the one of the plurality of sub-ranges; and a setting step of setting one of gradation characteristics including a first gradation characteristic in which gradation values are related to brightness levels represented with absolute brightness, and a second gradation characteristic in which gradation values are related to brightness levels represented with relative brightness, wherein in a case that the first gradation characteristic is set in the setting step, in the converting step, for each of a plurality of first sub-ranges, regions, in which brightness levels of the input image are included in one of the plurality of first sub-ranges, are colored with a color related to the one of the plurality of first sub-ranges, the first sub-ranges being obtained by dividing the dynamic range with thresholds represented with absolute brightness; and in a case that the second gradation characteristic is set in the setting step, in the converting step, for each of a plurality of second sub-ranges, regions, in which brightness levels of the input image are included in one of the plurality of second sub-ranges, are colored with a color related to the one of the plurality of second sub-ranges, the second sub-ranges being obtained by dividing the dynamic range with thresholds represented with relative brightness.

13. A non-transitory computer readable medium that stores a program, wherein
the program causes a computer to execute:

a converting step of converting colors of an input image based on information indicating a plurality of colors, wherein the plurality of colors is related to a plurality of sub-ranges consisting a dynamic range of the input image, respectively, wherein in the converting step, for each of the plurality of sub-ranges, regions, in which brightness levels of the input image are included in one of the plurality of sub-ranges, are colored with a color related to the one of the plurality of sub-ranges; and a setting step of setting one of gradation characteristics including a first gradation characteristic in which gradation values are related to brightness levels represented with absolute brightness, and a second gradation characteristic in which gradation values are related to brightness levels represented with relative brightness, wherein in a case that the first gradation characteristic is set in the setting step, in the converting step, for each of a plurality of first sub-ranges, regions, in which brightness levels of the input image are included in one of the plurality of first sub-ranges, are colored with a color related to the one of the plurality of first sub-ranges, the first sub-ranges being obtained by dividing the dynamic range with thresholds represented with absolute brightness; and in a case that the second gradation characteristic is set in the setting step, in the converting step, for each of a plurality of second sub-ranges, regions, in which brightness levels of the input image are included in one of the plurality of second sub-ranges, are colored with a color related to the one of the plurality of second sub-ranges, the second sub-ranges being obtained by dividing the dynamic range with thresholds represented with relative brightness.

* * * * *